United States Patent
Contreras et al.

(10) Patent No.: US 8,027,640 B2
(45) Date of Patent: Sep. 27, 2011

(54) ACOUSTIC SUPPRESSION USING ANCILLARY RF LINK

(75) Inventors: Nereydo T. Contreras, Miramar, FL (US); William R. Williams, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 471 days.

(21) Appl. No.: 12/337,191

(22) Filed: Dec. 17, 2008

(65) Prior Publication Data

US 2010/0151787 A1  Jun. 17, 2010

(51) Int. Cl.
*H04B 7/00* (2006.01)
(52) U.S. Cl. ........ 455/41.2; 455/501
(58) Field of Classification Search ........ 455/41.2, 455/501, 575.6, 114.2, 100, 570, 115.3
See application file for complete search history.

(56) References Cited

U.S. PATENT DOCUMENTS

| | | | |
|---|---|---|---|
| 5,357,609 A | 10/1994 | Sellers et al. | |
| 6,741,874 B1 | 5/2004 | Novorita et al. | |
| 6,888,811 B2 | 5/2005 | Eaton | |
| 6,925,296 B2 | 8/2005 | Mattisson | |
| 2004/0136543 A1* | 7/2004 | White et al. | 381/74 |

FOREIGN PATENT DOCUMENTS

WO  98-05135  2/1998

OTHER PUBLICATIONS

PCT International Appl. No. PCT/US2009/067954 International Search Report and Written Opinion of the International Searching Authority mailed Jul. 29, 2010, a foreign counterpart.

* cited by examiner

*Primary Examiner* — Peguy Jean Pierre
(74) *Attorney, Agent, or Firm* — Anthony P. Curtis; Daniel R. Bestor

(57) ABSTRACT

Methods and systems are described in which the feedback between a transmitter and collocated receiver is reduced so that the overall feedback loop gain is less than 0 dB. Audio is transmitted from the transmitter to the receiver through a primary RF link while RSSI or TOA information to determine the separation between the end devices is exchanged using an ancillary RF link. The total loop gain is calculated using the gain of each end device and the separation. If the distance is less than a threshold distance, the gain of one or more components in the transmitter and/or receiver is reduced.

20 Claims, 6 Drawing Sheets

ACOUSTIC SUPPRESSION USING ANCILLARY RF LINK

TECHNICAL FIELD

The present application relates to suppressing feedback. More specifically, the application relates to suppressing feedback between collocated end devices using an ancillary RF link between the devices to determine when to reduce gain in one or both of the devices.

BACKGROUND

Group-directed communications are commonplace in enterprise and public safety communication systems. With regard to audio communications, one end device (transmitter) transmits an audio signal (i.e., a "talkburst") to a given group (i.e. a "talkgroup") of receiving end devices (receivers). These receivers reproduce the audio signal through an amplified speaker. The manner in which the receivers operate usually results in the reproduced sound being audible to people other than merely the intended recipient.

Typically, in these group communication systems, the end devices are located near each other. This is particularly true in public safety uses, in which personnel often respond to incidences in a group, and this group (or a subset thereof) is located in the same local area for an extended period of time. If a transmitter and receiver are collocated, the microphone on the transmitter may pick up the audio signal that has been transmitted by the transmitter and reproduced by a loudspeaker on the receiver. Under certain conditions, the resulting feedback loop can reinforce itself to create an undesirable acoustic signal, herein referred to as "howling."

As above, such situations are especially prevalent in public safety incidents in which the transmitter and receiver(s) are often disposed within sufficient range and for a long enough time period to cause howling. While howling is irritating in normal situations, it is potentially disastrous during public safety incidents, notably if critical information is lost, misconstrued due to the feedback, or must be re-transmitted causing an unacceptable delay. It is therefore desirable to reduce, if not eliminate, instances of howling.

BRIEF DESCRIPTION OF THE DRAWINGS

Embodiments will now be described by way of example with reference to the accompanying drawings, in which:

FIG. 2 illustrates an embodiment of components in a transmitter and receiver in which

DETAILED DESCRIPTION

Figure 1:
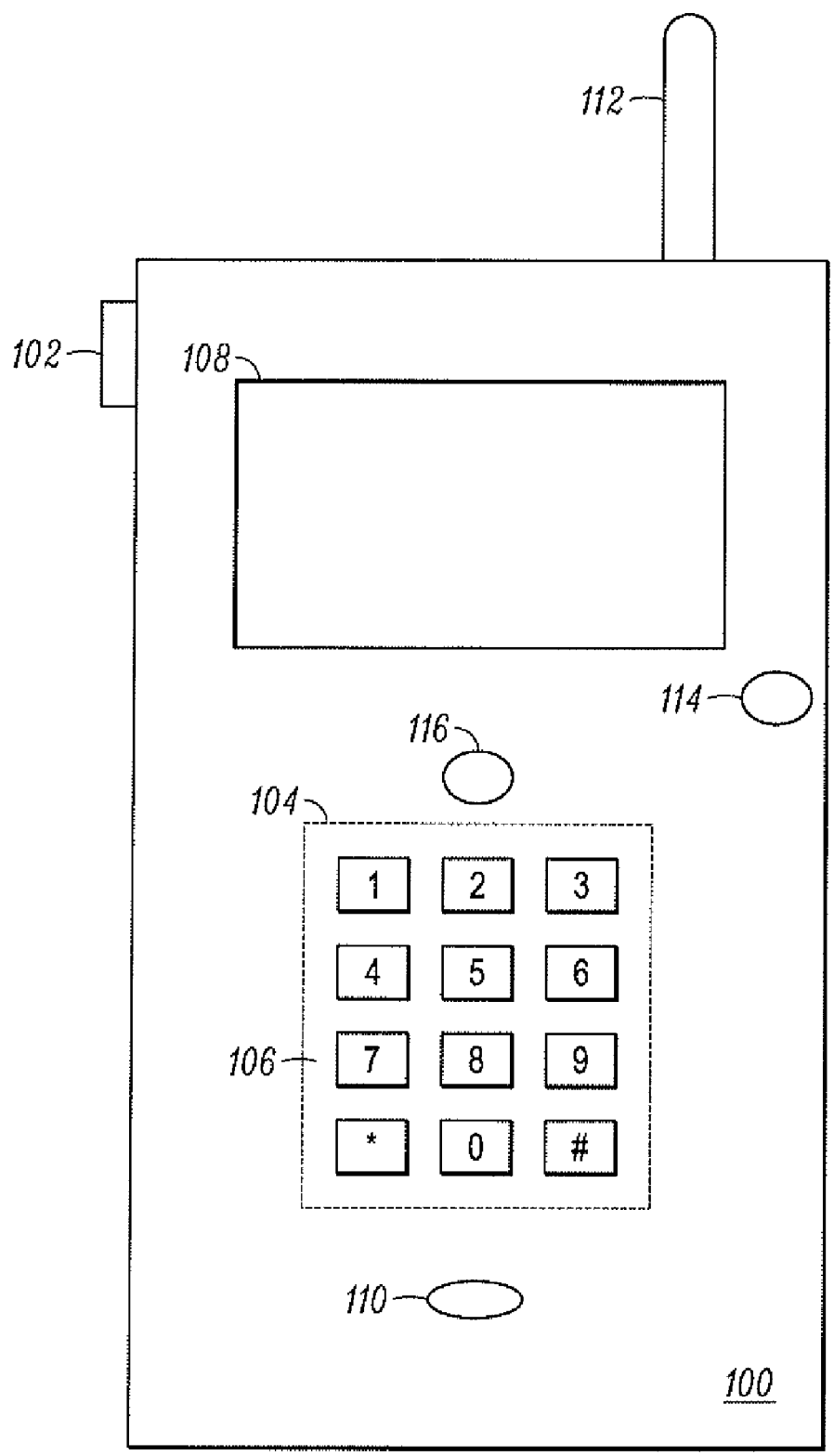
FIG. 1 illustrates an embodiment of a PTT end device.

A system and method are described in which howling between a transmitter and collocated receiver is reduced using an ancillary RF link. Prior to transmission of an audio signal from the transmitter using a primary RF link, communications over the ancillary RF link between the transmitter and receiver is used to estimate the distance between these devices. If the distance is less than a set distance, the gain of the feedback loop formed between the transmitter and receiver is reduced either or both at the transmitter or receiver.

As used herein, end devices are communication devices such as personally portable or vehicle-mounted mobile radios that able to communicate with each other, e.g. by having selected the same channel. A group of end devices is also referred to as a talkgroup. A particular channel on the end device is selected through one or more user-actuated selectors. An end device may be a transmitter that transmits an audio signal or a receiver that receives an audio signal transmitted by the transmitter. Audio transmitted on the channel is reproduced at the receiver. The end device contains one or more microphones including one or more microphones for the user to speak into to create the audio signal and, optionally, one or more noise cancelling microphones. Each receiver receives the audio signal either directly from the transmitter or through wireless or wired communication infrastructure and reproduces the audio signal using one or more speakers. The infrastructure contains one or more intermediaries such as base stations.

A collocated transmitter-receiver pair is a pair of end devices that are disposed in a relatively small area such that audio reproduction from the receiver is close enough to generate feedback via the transmitter (either due to the audio signal or due to a common noise source) sufficient to cause howling. The separation between the transmitter and receiver that leads to howling being generated depends on a number of different factors in the transmitter and receiver. These factors include the volume setting of the speaker of the receiver, the acoustic responses of microphone and the speaker, the position of microphone relative to the speaker, and the gains of the paths along the transmitter and along the receiver, among others. This separation can be as small as about 0.5-1 meters for standard push-to-talk (PTT) end devices or as large as about 30 meters for PTT end devices that have high audio output and/or high microphone gain. Of course, as this distance increases, howling becomes increasingly problematic.

A group communication system is a communication system in which multiple end devices are connected. When a particular end device is to transmit to the other end devices, an activation mechanism such as a PTT button is activated to initiate a signal. The signal initiated as a result indicates that the particular end device wishes to have the floor (i.e., the right to transmit). When the floor is available and the particular end device is granted the floor, it transmits to all of the end devices that have the appropriate channel selected (and that may have been granted access to the group communications).

Mission critical situations are situations in which it is imperative that communications between transmitters and receivers are able to be established initially and remain established. Mission critical situations include public safety operations at incidents. An incident is an event, such as an accident, in proximity to which collocated end devices are gathered.

One embodiment of the front of a PTT end device is shown in FIG. 1. The PTT device 100 includes a PTT button 102, an alpha-numeric keypad 104 containing keys 106, a microphone 110, an external and/or internal antenna 112, a channel selector 114, a speaker 116, and, optionally, a display 108 and/or a touch panel. One or more other microphones may be positioned at different positions on the PTT end device 100, e.g., on the front, one of the sides, or the back. The PTT button 102 permits the handset 100 to initiate a transmission when manually pressed and receive transmissions when released. The display 108 displays information such as group identification, transmission and reception frequencies, time/date, remaining power, incoming and dialed phone numbers, or information from the internet. Placement of the various elements in the PTT device 100 as shown in the figures is merely exemplary. In addition, not all PTT end devices have all of the components shown. For example, other PTT end devices may not contain a frequency switch, display, and/or keypad.

The end device contains various known communication components (not shown). Such components include, for example, a processor and communication modules to communicate via different technologies. Such technologies include circuit-switched and packet-switched broadband Radio Area Network (RAN) links. Circuit-switched narrowband RAN links include 25 kHz, 12.5 kHz, or 6.25 kHz equivalent Time or Frequency Division Multiple Access (TDMA or FDMA) air interfaces (e.g. Project 25, TETRA, DMR). Example packet-switched broadband RAN links include LTE, UMTS, EVDO, WiMAX, 802.11, Bluetooth, and WLAN air interfaces.

The end device is capable of communicating using the different technologies to transmit/receive different information simultaneously. In one embodiment, the group-directed communications are provided over a primary RF link while an ancillary RF link is a link between individual end devices. In one embodiment, the ancillary RF link is a short range link providing communications in a radius of several meters between end devices while the primary RF link is a long range link providing communications over much greater distances using network infrastructure. For example, an audio signal may be communicated via a primary 12.5 kHz TDMA link between widely-scattered end devices while other information may be communicated between collocated end devices via an ancillary Bluetooth link.

Figure 2A:
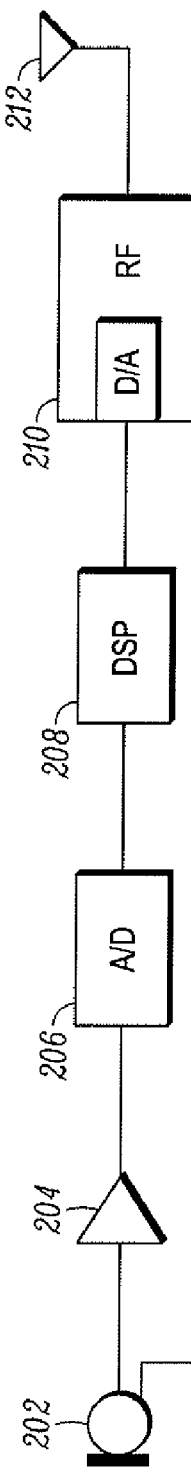
FIG. 2A illustrates the transmitter components and FIG. 2B illustrates the receiver components.

FIG. 2 illustrates the components of one embodiment of a transmitter. As shown in FIG. 2A, the transmitter 200 contains a microphone 202, a pre-amplifier (power amplifier) 204, an analog-to-digital converter (A/D) 206, a digital signal processor (DSP) 208, an RF transmitter circuit 210, and an antenna 212. The microphone 202 receives an audio input and converts the audio input into an analog signal. The analog signal from the microphone 202 is supplied to the pre-amplifier 204 whose gain can be preset or adjustable via an external adjustment mechanism or via an internal algorithm using the DSP 208 or a separate processor (not shown). The gain of the pre-amplifier 204 can be, for example, −14 dB to +16 dB. The amplified analog signal from the pre-amplifier 204 is then converted into a digital signal by the A/D converter 206. The digital signal from the A/D converter 206 is then processed by the DSP 208, where, for example, the signal is filtered or cross-correlated with other signals. The resulting processed signal from the DSP 208 is provided to an RF transmitter circuit 210 that contains a digital-to-analog converter (D/A) among other circuitry. The D/A converter in the RF transmitter circuit 210 converts the processed signal from the DSP 208 back into a processed analog signal, where it is supplied to and transmitted by the antenna 212. Although the pre-amplifier 204 is the only component in the transmitter 200 in which gain is explicitly described, the components may have preset or (manually or processor) adjustable gains. Other amplifiers/attenuators may be present in the transmitter chain.

Figure 2B:
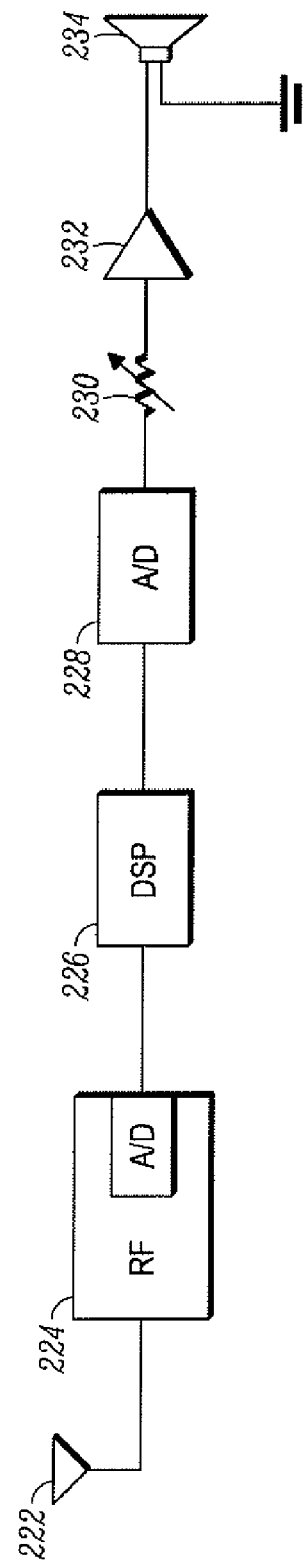

FIG. 2B illustrates a receiver 220 that contains an antenna 222, an RF receiver circuit 224, a DSP 226, a D/A converter 228, an attenuator 230, a power amplifier 232, and a speaker 234. A signal from the transmitter 200 is received by the antenna 222 of the receiver 220. The received analog signal is supplied to the RF receiver circuit 224. The RF receiver circuit 224 contains an A/D converter among other circuitry. The A/D converter converts the received analog signal into a digital signal for processing by the DSP 226. Accordingly, the digital signal from the RF receiver circuit 224 is processed by the DSP 226 and the processed signal then converted back to an analog signal by the D/A converter 228. The analog signal from the D/A converter 228 is then attenuated by the attenuator 230. The attenuation of the attenuator 230 may be preset or adjustable between, for example, 0 dB and −45 dB. The attenuated signal from the attenuator 230 is then supplied to the power amplifier 232, which again can have a preset gain (e.g., of 26 dB) or adjustable gain. The amplified signal from the power amplifier 232 is then provided to the speaker 234, where it is reproduced.

One or more base station(s) and other network infrastructure components may be used to supply the signal from the transmitter 200 to the receiver 220 as described in more detail below. The attenuation in such components may be offset by internal gain mechanisms and is thus ignored in this description. It is conceivable that the audio signal may be amplified or attenuated by the infrastructure components, and this factor may also be taken into account when determining whether and by how much to reduce the individual gains of the transmitter and/or receiver.

Figure 3:
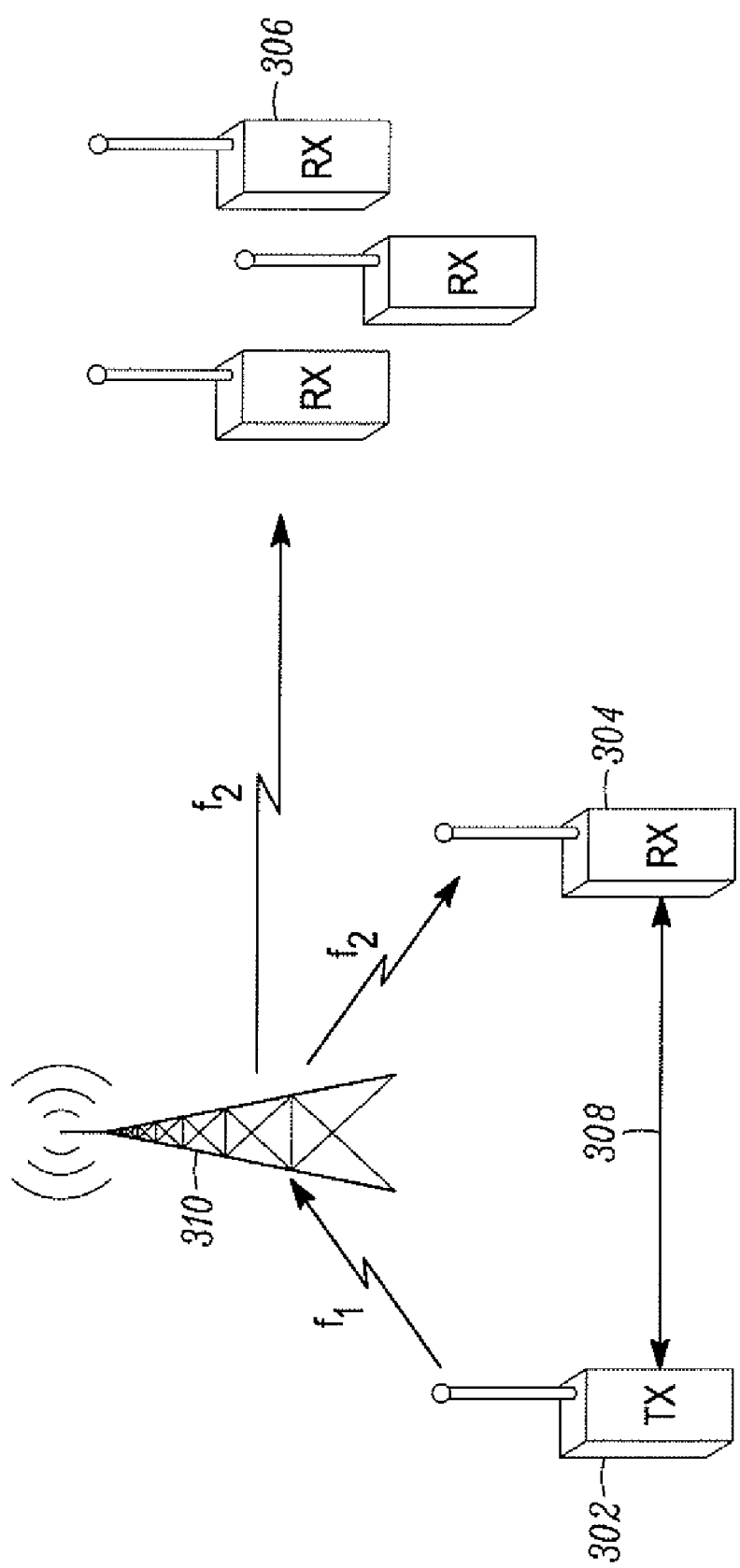
FIG. 3 illustrates one embodiment of a group communication system.

One embodiment of a PTT network is shown in FIG. 3. As shown, a transmitter (TX) 302 transmits an audio signal, which is received by one or more receivers (RX) 304 relatively proximate to the transmitter 302 and one or more receivers 306 relatively distal from the transmitter 302. The receivers 304, 306 and transmitter 302 communicate via one or more wireless networks through the same talkgroup. The receivers 306 may be separated at different locations or may be collocated at an incident scene. Similarly, the transmitter 302 may be collocated with one or more of the receivers 304, 306 at the incident scene or may be separated from the receivers 204, 306. The transmitter 302 and receivers 304, 306 may belong to different public safety groups, e.g. police, fire, and emergency medical personnel. Other network infrastructure elements such as base stations, routers, repeaters et al. that may be disposed between the transmitter 302 and the receivers 304 are shown as base station 310 for convenience.

The manner of transmission of the audio signal from the transmitter 302 to receivers 304, 306 is well known. This transmission may be indirect, i.e., from the transmitter 302 to receivers 304, 306 using the infrastructure 310, or may be direct, i.e., from the transmitter 302 directly to receivers 304, 306 within range of the transmitter 304 or other receivers 304, 306 (e.g., by using receivers to regenerate the signal) and without the use of the infrastructure 310.

As shown in the indirect connection of FIG. 3, the transmitter 302 receives an audio signal from the microphone (shown in FIG. 1), modulates the audio signal, and transmits the signal to the base station 310 on RF frequency $f_1$. The base station 310 re-transmits RF signal at RF frequency $f_2$ (although shown as different, the two frequencies shown could be the same). All of the receivers 304, 306, which are tuned to $f_2$, demodulate the audio signal received by the base station 310, and reproduce it through a speaker (shown in FIG. 1). If any of the receivers is proximate (or collocated) to the transmitter 302, the microphone of the transmitter 302 may pick up the audio from the speaker of the receiver. This is shown as a coupling (audio path 308) between the transmitter 302 and the proximate receiver 304.

An audio signal that travels along the audio path 308 and detected by the transmitter 302 is transmitted back to the receiver 304, forming a feedback loop. The free air loss along the audio path 308 is approximately inversely proportional to the separation between the transmitter 302 and the receiver 304. As above, if this loss is not enough to decrease the total gain (including RX gain, TX gain, and the free air loss) around the loop at all frequencies to less than 0 dB, and the phase shift is a multiple of 360° (i.e., there is effectively zero phase shift), the receiver 304 will lock into a single tone and howling will occur. This tone will be at the frequency where the maximum gain is located. The zero phase condition is easily met at audio frequencies between 300 and 3 kHz as the wavelength of tones in this range is smaller than the distance between the transmitter 302 and the receiver 304 and thus there will be multiple zero crossing of the unwrapped phase. If the delay through the feedback loop is relatively long, an echo-like or reverberating sound will occur instead of single tone.

Figure 4:
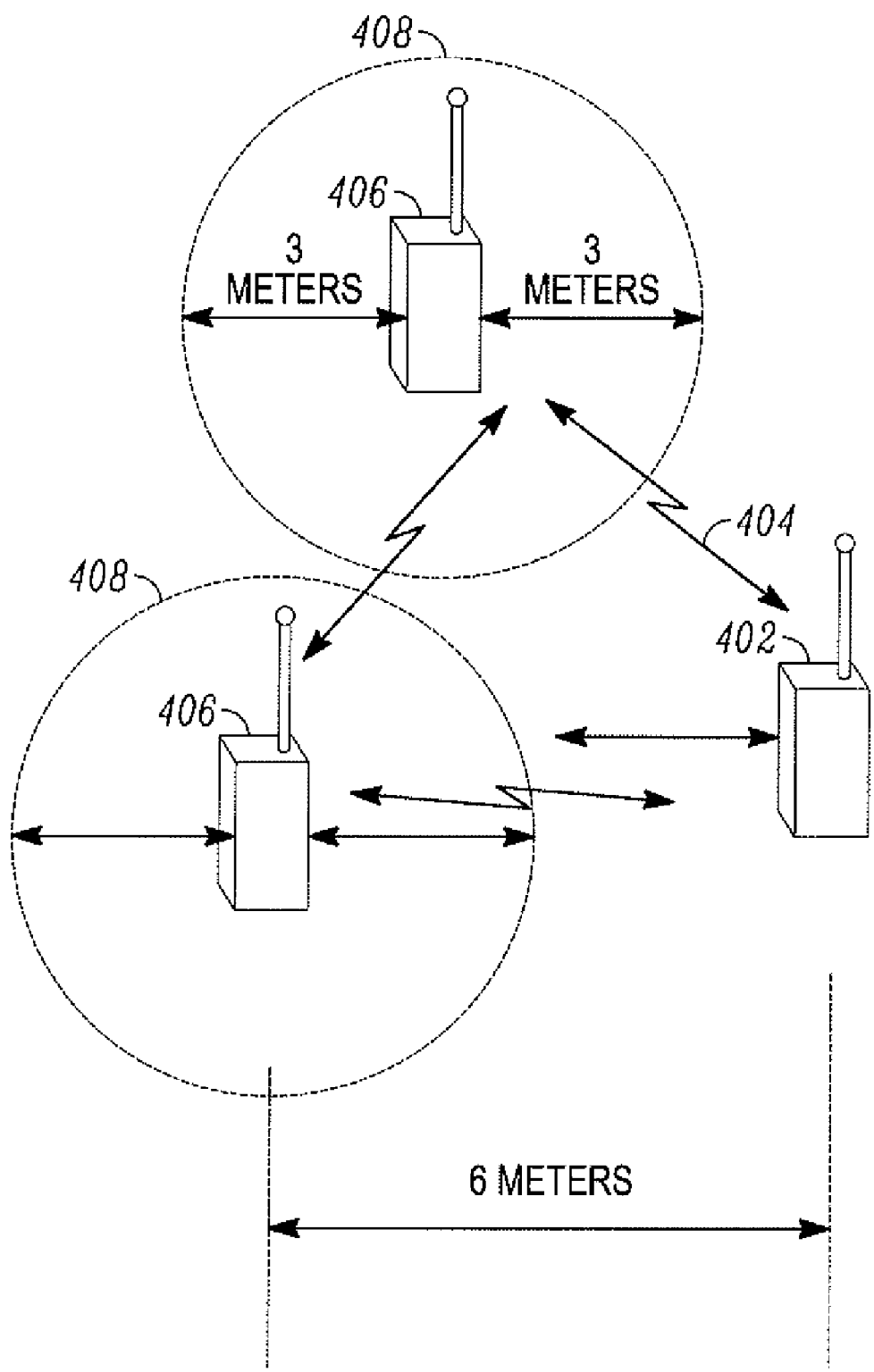
FIG. 4 illustrates one embodiment of communications between collocated end devices.

To reduce (or eliminate) howling, the embodiment of communications between collocated end devices shown in FIG. 4 uses the ancillary RF link to pass information between the collocated transmitter and receiver(s). This information includes the gain originating in the end device from which the information is being transmitted, information permitting estimation of the relative distance between the end devices, characteristics of the components in the end device, etc. This information is used by one or more of the end devices forming the feedback loop to reduce the overall gain in the loop to less than 0 dB. The total gain is the gain through the loop at the frequency at which the gain is a maximum.

In one embodiment, the information provided by the transmitter and receiver is used to calculate the total gain and reduce the gain by adjusting the gain of one or more of the components in the transmitter and/or receiver. For example, the gain of the power amplifier 204 in the transmitter 200 of FIG. 2A may be automatically reduced using a processor in the transmitter 200. Similarly, the attenuation of the attenuator 230 in the receiver 220 of FIG. 2B may be automatically increased using a processor in the receiver 220. The total gain calculation and/or adjustment may take place in either or both the transmitter 200 or the receiver 220.

In general, as there may be a significant amount of noise in the background and as the receiver volume may be habitually set at a maximum by the public safety user, it may be preferable to reduce the gain of the power amplifier, microphone, and/or other components (or increase the attenuation) in the transmitter. In addition, the total gain in all transmitter/receiver pairs is reduced by reducing the portion of the total gain provided by the transmitter. Thus, the gain in individual receivers may or may not be changed as desired. In such an embodiment, the portion of the total gain provided by different receivers may be different, thereby permitting different gain changes in different receivers. For example, the attenuation in a collocated receiver that is more distant from the transmitter than another collocated receiver may be reduced if the transmitter gain is reduced by an amount determined based on the total gain provided by the transmitter and the other collocated receiver. To accomplish this, the reduction in transmitter gain may be provided to the receiver, which then increases its gain to compensate at least partially for this reduction. Alternatively, each collocated receiver may calculate a desired amount of gain reduction and reduce its own portion of the total gain independently, for example, by reducing the volume of the loudspeaker or increasing the amount of attenuation of the attenuator.

In any case, the adjustment is performed automatically, e.g., by the processor. The gain in either or both of the transmitter and receiver may be adjusted continuously to compensate for changing parameters such as changes in separation and alterations of the manually-set volume. This continuous adjustment may occur as changes are sensed or only after particular thresholds in the total gain are reached. Correspondingly, the adjustments may be made in discrete steps corresponding to the thresholds. The thresholds may be greater than the minimum changes able to be sensed and correspondingly, the steps may be greater than the minimum changes able to be made. The total gain may be nominally maintained at a predetermined level, such as −0.5 dB, −1 dB, or −2 dB. As the difference between the predetermined level and 0 dB is increased, the thresholds and steps may correspondingly be increased due to the desire for reduced sensitivity to change in the total gain (i.e., the total gain is able to change by a greater amount before reaching howling conditions). Thus, for example, the steps may be adjusted as desired to reduce the gain only when the separation (or 1/separation) changes by a predetermined percentage or distance (assuming that the adjustable aspects of the gain remain fixed between measurements). The changes may be effected by altering one or more manually or processor-adjustable gain components within the transmitter and/or receiver (such as reducing the gain of a power amplifier or increasing the attenuation of an attenuator). Alternatively, the changes may be effected by simply activating or deactivating one or more of the gain components within the transmitter and/or receiver.

As above, the loop gain calculation may be performed in either or both the transmitter and receiver of a particular transmitter/receiver pair, or may be performed by an external device in communication with one or more of the end devices. In the latter case, all of the information pertinent to the calculation may be transferred by the individual end devices or collected at one end device and transmitted to the calculating device. In the former cases, once the calculation is performed and the amount of loop gain determined, the gain is reduced in the end device performing the calculation and/or in the other end device.

As shown in the embodiment of FIG. 4, the transmitter 402 may communicate directly to the proximate receivers 406 (i.e., without passing through any intermediaries) through the primary RF link as well as communicating through the ancillary RF link 404 to the proximate receivers 406. The receivers 406 themselves may also pass information using the ancillary RF link or a different ancillary RF link. The range of ancillary RF link can extend up to about 10 meters for a class 2 Bluetooth device and up to about 100 meters for a class 1 Bluetooth device. Similarly, if the ancillary RF link is a WLAN or Zigbee link, the range can extend up to about 400 meters. Although the communication range is relatively far, the ancillary RF link is able determine the separation between end devices to within about 3-6 meters. Such an arrangement is also effective when only two devices are communicating.

As above, the receivers in various embodiments may transmit/receiver information about other receivers and/or the transmitter. This is beneficial, for example, in instances in which one or more of the receivers are out of range of the ancillary RF link to the transmitter but which is close enough to the transmitter such that howling is still possible. For example, the range of communications using a typical class 2 Bluetooth link is limited to a few meters while howling may occur if the transmitter/receiver separation is several tens of meters. Thus, if the ancillary RF link used to pass information between the transmitter and receiver is a Bluetooth link, information to reduce the loop gain will not be able to be transmitted directly between the end devices and thus may not be used to eliminate howling. The information can be sent to other end devices within range of the receiver and then propagated to the transmitter directly or through other end devices closer to the transmitter. Alternatively, the information can be communicated via a different ancillary RF link if it is determined that communications using the original ancillary RF link are desired but not possible.

The information transmitted using the ancillary RF link may be tabulated or otherwise stored in a local memory of one or more of the end devices. The ancillary RF link may be continually active or be activated according to one or more criteria. Such criteria may include, for example, every time (or every set number of times) the PTT button on one of the end devices is actuated or a preset (set at the factory or user/group set) amount of time after the PTT button on one of the end devices is actuated. Activating the ancillary RF link causes the total gain information to be updated. The positions of the individual end devices (or separation between a particular transmitter/receiver pair) and the total gain of the particular transmitter/receiver pair (which is dependent on external settings of the individual devices), for example, may be updated.

As above, the total gain is calculated from the internal gain settings of each of the transmitter and receiver as well as the acoustic loss due to propagation. If the total gain approaches 0 dB, the total gain is reduced to correspondingly reduce feedback between the transmitter and receiver. To determine the separation between the transmitter and receiver, the distance between the end devices is first estimated. To perform this estimation, the processor performing the calculation uses one or more of various techniques. These techniques include using radio signal strength (RSS) (as the transmission will have a transmission power set by the standard of the ancillary RF link used) or time of arrival (TOA) (e.g., using a time stamp on the transmission) information, or angle of arrival (AOA) for example. All of these techniques are known to one of skill in the art and thus an extended discussion will be omitted for brevity.

Although using more multiple information sources (e.g., RSS, TOA, AOA) may be more computationally intensive, they each have their individual drawbacks. For example, RSS is more inaccurate due to near field effects, saturation, and other effects. Thus, if the Receive Signal Strength Indicator (RSSI) is exclusively used to determine separation between the transmitter and receiver, the processor algorithm may use activation/deactivation of one (or more) of the gain components in the transmitter and/or receiver rather than continuously altering the gain component and/or may give a greater margin of safety.

On the other hand, TOA is substantially more accurate than RSS. The main source of error in separation calculations using TOA are due to the clock limitations of the hardware implementation used. Communications between the end devices via the ancillary RF link use time stamping, which relies on each end device having clock times that are the same (e.g., being set by GPS). If these times are not the same (and the offset is unknown), then the separation will correspondingly be unable to be determined. In addition, if multipath effects are prominent, the information may be less reliable. Multipath problems may be reduced by using a maximum length sequence (MLS) or other coded "ping" signal allow for easy removal of the reflection interferences. A cross-correlation scheme can be used with such a signal.

Ideally, however, a combination of RSS, TOA, and/or AOA can be used. In one embodiment, a combination of RSS and TOA are used. To employ this combination, the results of the RSS estimation are reviewed and if the RSSI is above a preset threshold, the TOA information is used to provide the separation. Alternatively, of course, another RSSI may be obtained for confirmation rather than using the TOA information.

In addition, although location techniques such as GPS are relatively expensive and not presently accurate enough to resolve the individual positions of the end devices for the separation range over which howling occurs, as well as encountering difficulties if the end device is in a shielded location, such technologies may be used when viable.

Figure 5:
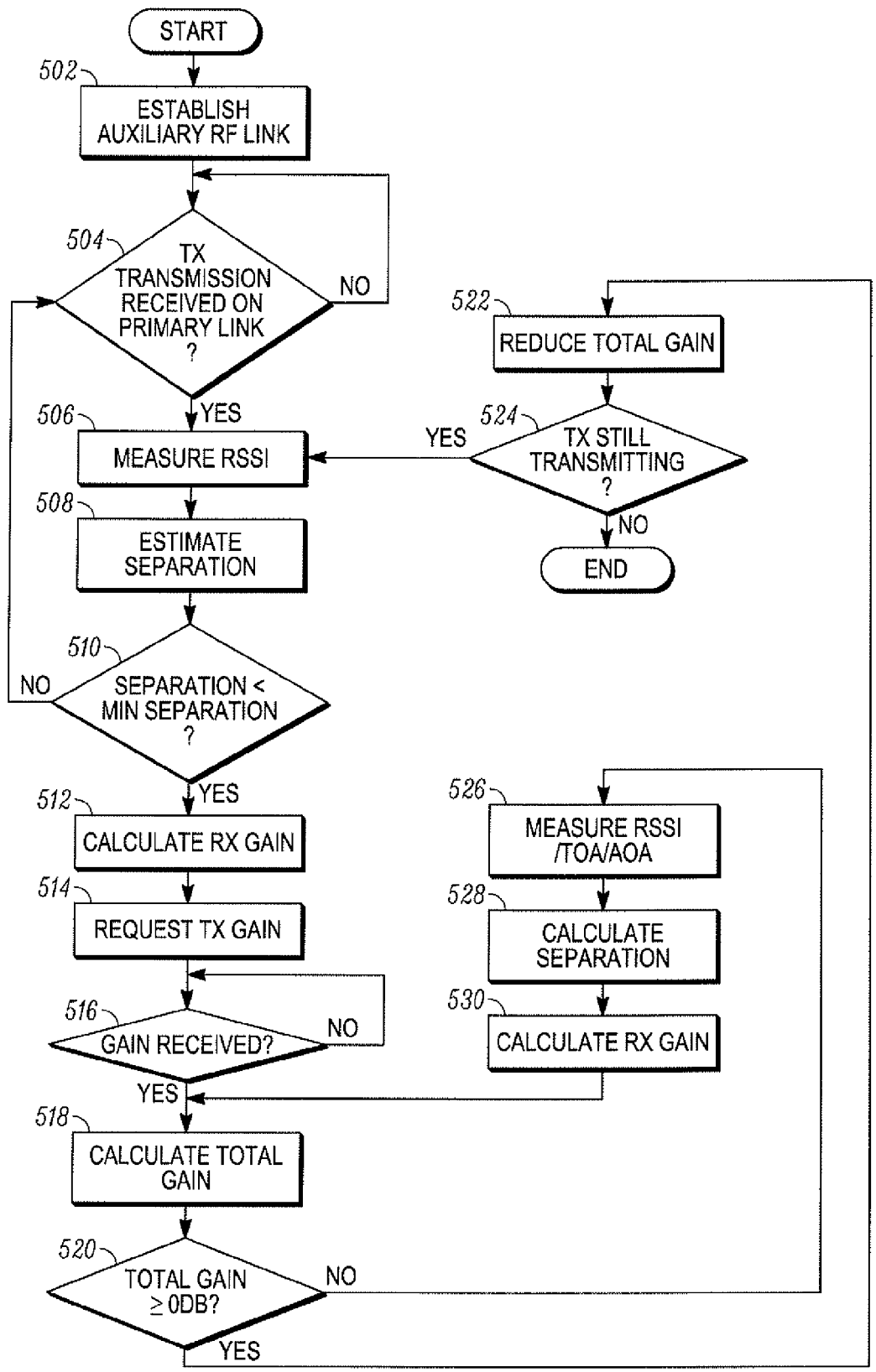
FIG. 5 is one embodiment of a flowchart of feedback detection.

One embodiment of a method of adjusting the total gain is shown in the receiver flowchart of FIG. 5. In the adjustment method 500 of FIG. 5, the gain adjustment occurs in the receiver; any gain adjustment occurring in the transmitter is not shown. The adjustment method 500 starts by establishing communications between the end devices via the ancillary RF link 502. Once the link is established, the receiver waits until an audio signal has been received via the primary RF link 504. If an audio signal has been received via the primary RF link, the RSSI of communications over the ancillary RF link is measured 506 and the distance is initially estimated 508. If the estimated distance is greater than or equal to a minimum separation, the RSSI of communications over the ancillary RF link is again measured if the transmission continues and the cycle repeats. This measurement may occur continuously or at predetermined time intervals as long as the transmission continues.

The minimum separation may be determined in the factory or otherwise prior to transmission. The minimum separation may be the separation at which the total gain is 0 dB or greater when the transmitter and receiver gains are maximized. Alternatively, the minimum separation may be larger than this separation (e.g., by a particular % of the separation, absolute distance such as a meter, or by a particular dB) to provide a buffer.

If the estimated distance is less than the minimum separation, the gain in the receiver is determined 510. The method by which the gain in the receiver is calculated is shown more detail in FIG. 6. Once the receiver gain is calculated, the receiver requests the transmitter gain through the ancillary RF link 512. The method by which the gain in the transmitter is calculated is shown more detail in FIG. 7. The transmitter gain is calculated and then transmitted to the receiver where it is received 516. Once the transmitter gain is received, the total gain is calculated using the transmitter and receiver gains as well as the separation calculated using the RSSI 518. The calculated total gain is then compared to 0 dB 520. If the gain is bigger or equal 0 dB, the gain is reduced 522 and the method continues by once again measuring RSSI of communications over the ancillary RF link if the transmission over the primary RF link continues 524 and terminates if not. As many group-directed communications are relatively short, this last step may, of course, be omitted.

If the gain is less than 0 dB, the RSSI over the ancillary RF link or the TOA is obtained 526. The separation is then calculated using the RSSI or TOA information 528, the receiver gain is re-calculated 530, and the total gain is re-calculated 518. As above, in other embodiments, AOA data may be used instead of, or in addition to, TOA data in conjunction with RSSI data.

The method may be altered if the transmitter is performing the method of FIG. 5. For example, the receiver gain would be obtained via the ancillary RF link and the transmitter gain adjusted after the calculation.

Figure 6:
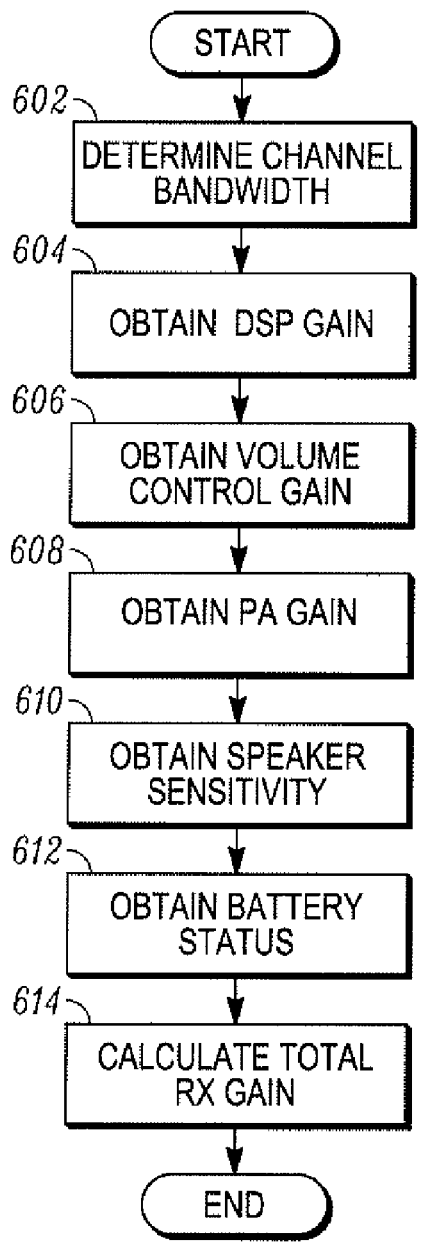
FIG. 6 is one embodiment of a flowchart of the transmitter gain.

The receiver gain is calculated using the method 600 of FIG. 6. To calculate the receiver gain, the receiver determines the primary RF link type 602. For example, as above, the bandwidth of PTT communications may be 12.5 kHz or 25 kHz. This is used as the gain calculation depends on the bandwidth. The various gain components that are obtained include: the DSP gain 604, the volume control gain 606, the power amplifier gain 608, the sensitivity of the loudspeaker 610, and the battery status 612. The battery status is used to determine whether the receiver has sufficient power to receive and/or reproduce the audio signal as the ancillary RF link may be able to operate at a lower voltage than the primary RF link. Thus, if the battery power is sufficiently low, for example, the audio signal may be received without having enough power to be reproduced. If the battery status is too low, the receiver may not initiate or prematurely terminate the calculation to conserve power. Accordingly, in one embodiment, the battery status may be obtained first to determine whether any further processing is desirable. After the gain components are obtained, they are combined to determine the gain of the receiver 614. The various gain components of the receiver may be determined in any order.

Figure 7:
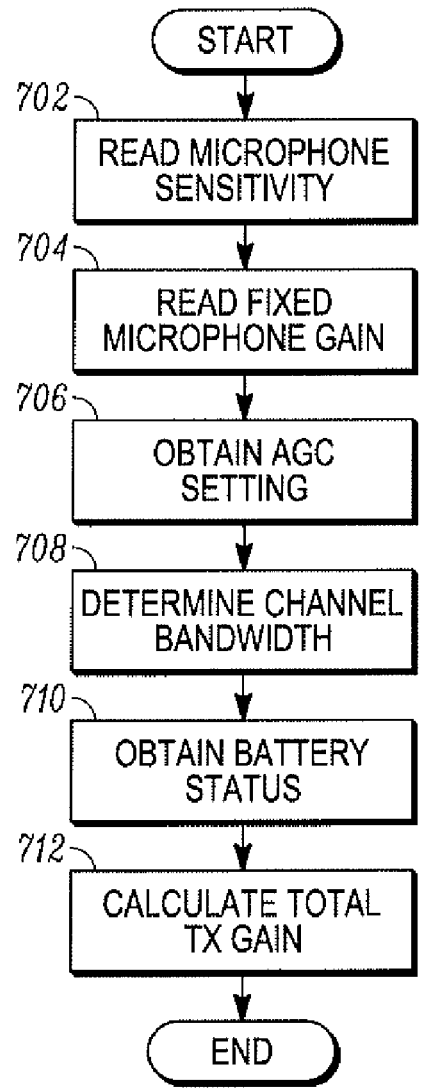
FIG. 7 is one embodiment of a flowchart of the receiver gain.

In a similar manner, and as shown in the method 700 of FIG. 7, the transmitter gain is calculated. To calculate the transmitter gain, the transmitter obtains the various gain components including: the microphone sensitivity 702, the analog fixed gain of the microphone 704, the automatic gain control (AGC) of the microphone 706, the primary communication link bandwidth 708, and the battery status 710. Determining the battery status in the transmitter and/or receiver permits confirmation that either or both the transmitter and receiver has power and allows determination of how fast the battery of the device whose battery status is being reviewed is being drained. The battery status of each device can be communicated to the other using the ancillary RF link; accordingly obtaining the battery status in FIGS. 6 and 7 can refer to obtaining the battery status of the device (e.g. in FIG. 6, the receiver) and/or obtaining the battery status of the other device (e.g., in FIG. 6, the transmitter). After the gain components are obtained, they are combined to determine the gain of the transmitter 712. Similar to the receiver gain components of FIG. 6, the various gain components of the transmitter may be determined in any order.

In other embodiments, the order of the individual steps shown in the method 700 of FIG. 7 can be altered. For example, the measurements, calculations, and/or adjustment can be performed automatically independent of whether the transmitter and receiver are in communication via the primary RF link. However, doing so may increase the power drain on portable transmitter/receiver compared with performing these only after a transmission via the primary RF link is detected.

Although group communication systems have been described, use of the separate ancillary RF link in the manner above may be extended to other communication systems in which the transmitter and receiver are collocated and that are susceptible to feedback. Thus, this technique can be used in device-to-device communication systems.

In addition, although only gain reduction is described above, a similar method may be employed to increase the total gain to ensure that the total gain is within a predetermined range of (and less than) 0 dB. Thus, for example, as the transmitter and receiver move towards each other, the gain may be reduced using the methods above. Subsequently, as the transmitter and receiver move away from each other, the gain may again be increased by adjusting the gain of the components whose gain was reduced. The total gain can be adjusted, for example, to achieve maximum gain. This maximum gain may be, for example, the greater of about 0 dB or the gain of the system if it does not exceed about 0 dB.

Although an embodiment has been described in which the transmitted and received signals are analog signals, adjustment of the gain may occur in other types of systems. Such systems include those in which the transmitted and received signals are digital signals. In addition, one or more of the components described above, such as the DSP, may not be present in various embodiments depending on the radio model.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of reducing audio feedback between a collocated transmitter and receiver, the method comprising:
   connecting the collocated transmitter and receiver via an ancillary RF link;
   determining whether a separation between the transmitter and receiver is less than a minimum separation based on information passed between the transmitter and receiver on the ancillary RF link;

calculating a total gain of an audio feedback loop that includes the transmitter and receiver if the separation between the transmitter and receiver is less than the minimum separation, the total gain including gains of the transmitter and receiver for an audio signal transmitted and received, respectively, by the transmitter and receiver; and if the total gain is at least a threshold gain, prior to the audio signal from the transmitter being received by the receiver via a primary RF link, reducing at least one of the transmitter or receiver gain such that the reduced total gain is less than the threshold gain.

2. The method of claim 1, wherein the ancillary RF link is a short range communication link.

3. The method of claim 2, wherein the ancillary RF link is a Bluetooth link.

4. The method of claim 1, wherein the determining comprises measuring at least one of RSSI or TOA or AOA information.

5. The method of claim 4, wherein:
the determining comprises:
  measuring RSSI information to estimate the separation, and
  determining if the estimated separation is less than the minimum separation;
the calculating comprises:
  if the estimated separation is less than the minimum separation, calculating the total gain using the estimated separation,
  if the total gain using the estimated separation is less than 0 dB, measuring the TOA and/or AOA information or re-measuring the RSSI information,
  calculating the separation using the TOA and/or AOA information or re-measured RSSI information,
  re-calculating the receiver gain, and
  re-calculating the total gain using the separation obtained using the TOA and/or AOA information or re-measured RSSI information; and
the reducing comprises reducing the at least one of the transmitter or receiver gain if the total gain using the estimated separation or the re-calculated total gain is at least 0 dB.

6. The method of claim 5, wherein:
the determining further comprises transmitting the transmitter gain to the receiver,
the calculating comprises the receiver calculating the total gain using the estimated separation or the re-calculated total gain, and
the reducing further comprises reducing the receiver gain.

7. The method of claim 1, further comprising establishing the minimum separation by determining maximum transmitter and receiver gains and calculating a distance at which the threshold gain is exceeded using the maximum transmitter and receiver gains.

8. The method of claim 1, wherein the transmitter and receiver are end devices in a group communication system, the primary RF link providing group communication and the ancillary RF link providing communications between individual end devices.

9. The method of claim 1, the calculating further comprising checking a battery status of the receiver to determine whether the receiver has sufficient power to reproduce the audio signal.

10. The method of claim 1, further comprising repeating the determining, calculating, and reducing every time the transmitter is to send an audio signal to the receiver.

11. The method of claim 1, further comprising repeating the determining, calculating, and reducing every predetermined period of time after the audio signal is received while the transmission is maintained.

12. The method of claim 1, further comprising repeating the determining and calculating according to one or more predetermined criteria, wherein the reducing comprises reducing the at least one of the transmitter or receiver gain by a discrete step that is dependent on a desired sensitivity to changes in the separation.

13. A group communication system comprising:
a transmitter; and
a plurality of receivers in the group communication system, the plurality of receivers including a first receiver collocated with the transmitter, the transmitter configured to transmit an audio signal to the receivers via a primary RF link,
wherein:
each of the transmitter and first receiver comprises a processor and at least one manually or processor-adjustable gain component,
the transmitter and first receiver are connected via a short-range ancillary RF link, signal information and a gain of the transmitter or the first receiver being communicated over the ancillary RF link, and
the transmitter or the first receiver:
  determines a separation between the transmitter and the first receiver from the signal information,
  compares the separation to a minimum separation,
  if the separation is less than a minimum separation, calculates a total gain of an audio feedback loop that includes the transmitter and first receiver from the separation and the gains of the transmitter and the first receiver, and
  if the total gain is at least a threshold gain, prior to the audio signal from the transmitter being received by the first receiver, reduces at least one of the transmitter or first receiver gain such that the reduced total gain is less than the threshold gain.

14. The system of claim 13, wherein the transmitter or the first receiver:
measures RSSI information to estimate the separation,
determines whether the estimated separation is less than the minimum separation,
calculates the total gain using the estimated separation if the estimated separation is less than the minimum separation,
determines whether the total gain using the estimated separation is less than 0 dB,
measures TOA information or re-measures the RSSI information if the total gain using the estimated separation is less than 0 dB,
calculates the separation using the TOA information or re-measured RSSI information,
re-calculates the first receiver gain,
re-calculates the total gain using the separation obtained using the TOA information or re-measured RSSI information, and
reduces the at least one of the transmitter or first receiver gain if the total gain using the estimated separation or the re-calculated total gain is at least 0 dB.

15. The system of claim 14, wherein:
the transmitter transmits the transmitter gain to the first receiver, and
the first receiver reduces the first receiver gain if the total gain using the estimated separation or the re-calculated total gain is at least 0 dB.

16. The system of claim 15, wherein the first receiver checks a battery status of the first receiver to determine whether the first receiver has sufficient power to reproduce the audio signal prior to reducing the first receiver gain.

17. The system of claim 13, wherein the minimum separation is a distance at which the threshold gain is exceeded using maximum transmitter and first receiver gains.

18. The system of claim 13, wherein the transmitter comprises a PTT button which, when actuated, permits the transmitter to transmit the audio signal to the receivers and initiates whether the reduction of at least one of the transmitter or first receiver gain is to be performed.

19. A method of reducing audio feedback between a collocated transmitter and receiver in a group communication system, the transmitter and receiver respectively having a transmitter and receiver gain for an audio signal provided thereto and transmitted by the transmitter to the receiver, the method comprising:
    connecting the collocated transmitter and receiver of the group communication system via a primary RF link and an ancillary short-range RF link;
    transmitting a non-audio signal from the transmitter to the receiver using the ancillary RF link;
    determining a separation of the transmitter and receiver based on the non-audio signal;
    comparing the separation to a minimum separation;
    if the separation is less than the minimum separation, prior to the audio signal from the transmitter being received by the receiver, the receiver:
        requesting the transmitter gain from the transmitter,
        receiving the transmitter gain from the transmitter in response to the request,
        calculating a total gain that includes the transmitter and receiver gains and depends on the separation,
        comparing the total gain to a threshold gain at or below 0 dB, and
        reducing the receiver gain such that the reduced total gain is less than the threshold gain if the total gain is at least the threshold gain.

20. The method of claim 19, further comprising the receiver: initially estimating the separation using a RSSI and if the total gain calculated using the estimated separation is less than the threshold gain, receiving a new non-audio signal from the transmitter through the ancillary RF link, the new non-audio signal containing at least one of TOA information or a new RSSI, determining a revised separation from the at least one of the TOA information or new RSSI, and re-calculating the total gain using the revised separation.

* * * * *

UNITED STATES PATENT AND TRADEMARK OFFICE
CERTIFICATE OF CORRECTION

PATENT NO. : 8,027,640 B2  
APPLICATION NO. : 12/337191  
DATED : September 27, 2011  
INVENTOR(S) : Contreras et al.

Page 1 of 1

It is certified that error appears in the above-identified patent and that said Letters Patent is hereby corrected as shown below:

On the Face Page, in the Figure, delete " 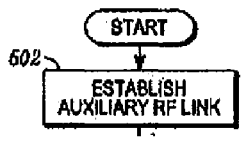 " and insert -- 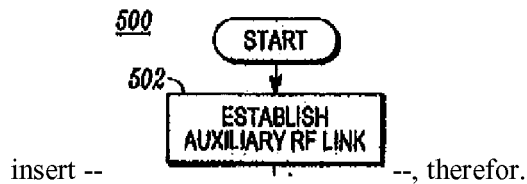 --, therefor.

In Fig. 5, sheet 5 of 6, delete " 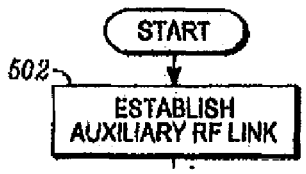 " and insert --  --, therefor.

In Fig. 6, sheet 6 of 6, delete "  " and insert -- 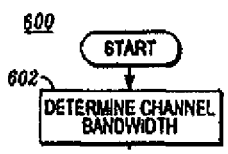 --, therefor.

In Fig. 7, sheet 6 of 6, delete " 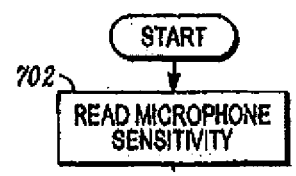 " and insert -- 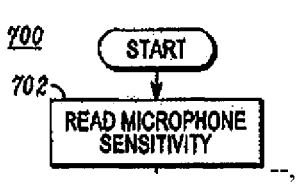 --, therefor.

Signed and Sealed this  
Eighteenth Day of December, 2012

David J. Kappos  
*Director of the United States Patent and Trademark Office*